United States Patent [19]
Jeninga

[11] 3,807,751
[45] Apr. 30, 1974

[54] WHEEL SUPPORT STRUCTURE FOR GOLF CART

[75] Inventor: John Jeninga, Delavan, Wis.

[73] Assignee: Sit N Rest Golf, Inc., Milwaukee, Wis.

[22] Filed: July 19, 1972

[21] Appl. No.: 273,166

[52] U.S. Cl............................................. 280/41 D
[51] Int. Cl.............................................. B62b 3/02
[58] Field of Search............ 280/40, 38, 36 R, 36 C, 280/41 C, 41 D; 287/100; 113/116 F, 116 HA, 116 W, 116 AA, 116 HA

[56] References Cited
UNITED STATES PATENTS

| | | | |
|---|---|---|---|
| 2,564,828 | 8/1951 | Alexander | 280/38 |
| 1,369,975 | 3/1921 | Johnson | 113/116 F |
| 2,789,829 | 4/1957 | Parker | 280/36 C |
| 2,877,034 | 3/1959 | Crandall | 287/100 |
| 3,561,555 | 2/1971 | Carmichael | 280/36 C |

*Primary Examiner*—Richard J. Johnson
*Assistant Examiner*—Reinhard J. Eisenzopf
*Attorney, Agent, or Firm*—Michael, Best & Friedrich

[57] ABSTRACT

A wheel support structure for a golf cart including a frame member adapted for supporting a golf bag thereon and a pair of axle members each having a wheel rotatably mounted thereon. A strut means is provided for mounting each of said axle members on said frame member. The strut means includes at least one strut member fastened at its upper end to said frame member and having an axle connecting end portion at its lower end adapted for pivotal connection to the axle member. The strut member is made from a tubular member which has one end crimped, split and deformed to form a pair of parallel extending spaced arm members formed integrally with the strut member. Each of the arm members is comprised of outer and inner wall portions which are flattened against each other and which are formed integrally with each other. The inner wall portion of each arm member is split longitudinally along the length thereof during the formation process. A connecting means such as a rivet is passed through an opening in the axle and through aligned openings in the arm members with the arm members positioned on opposite sides of the axle member.

3 Claims, 7 Drawing Figures

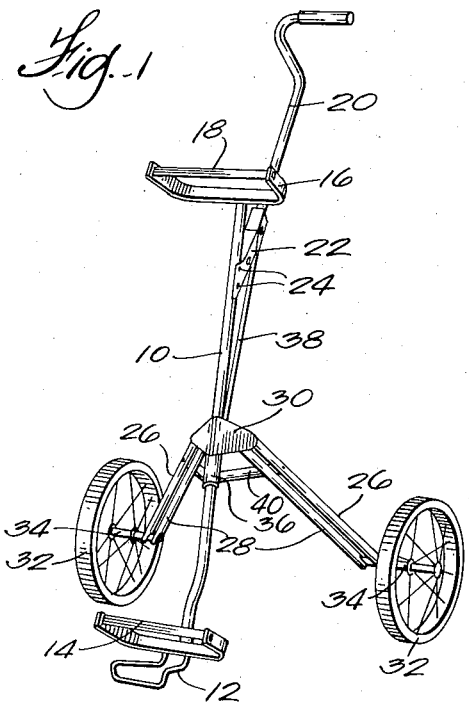
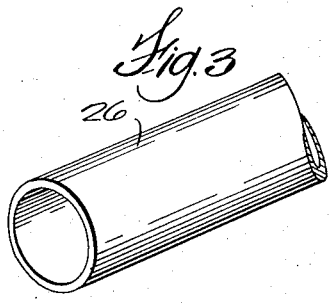
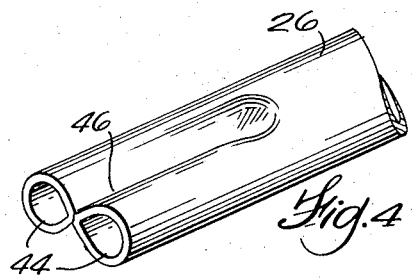
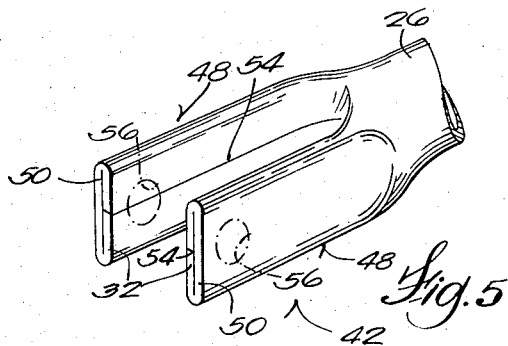
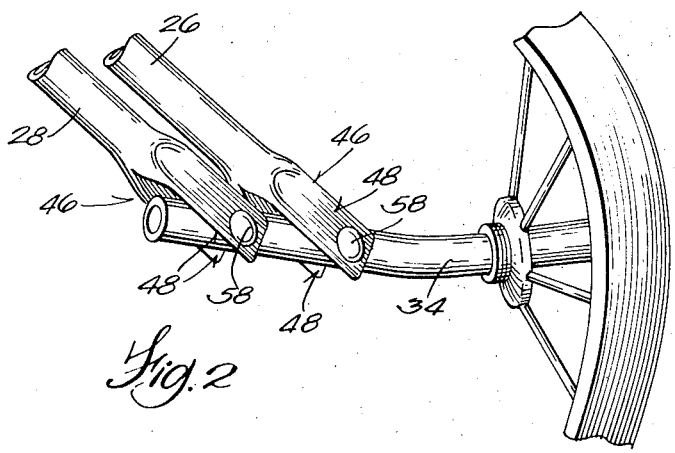

WHEEL SUPPORT STRUCTURE FOR GOLF CART

BACKGROUND OF THE INVENTION

One major source of failure in a conventional golf cart is in the structure for supporting the wheel axles on the cart. This is because such structure must withstand the major portion of the stresses and strains imposed on the cart structure when it is being used. The principal object of this invention is to provide a low cost, easily fabricated wheel support structure which provides improved strength and durability characteristics over prior designs.

SUMMARY OF THE INVENTION

A wheel support structure for a golf cart including a frame member and an axle member having a wheel rotatably mounted thereon. A strut means is provided for mounting the axle member on the frame member. Such strut means includes at least one strut member fastened to the frame member at its upper end and having an end portion at its lower end adapted for pivotal connection to the axle member. Such lower end portion is comprised of a pair of parallel extending spaced arms formed integrally with the strut member with each of said arms comprised of outer and inner wall portions which have been flattened against each other and which are formed integrally with each other. The strut is pivotally connected to the axle by any suitable means such as a rivet inserted through an opening in the axle and through aligned opening in the arms of the strut end portion with such arms positioned on opposite sides of the axle.

DESCRIPTION OF THE DRAWINGS

FIG. 1 is a perspective view of a golf cart constructed in accordance with the present invention;

FIG. 2 is an enlarged fragmentary perspective view of the wheel support structure of the cart shown in FIG. 1;

FIGS. 3, 4 and 5 are enlarged fragmentary perspective views of one end of a wheel axle support strut showing it in various stages of its formation;

DESCRIPTION OF THE PREFERRED EMBODIMENT

Figure 6:
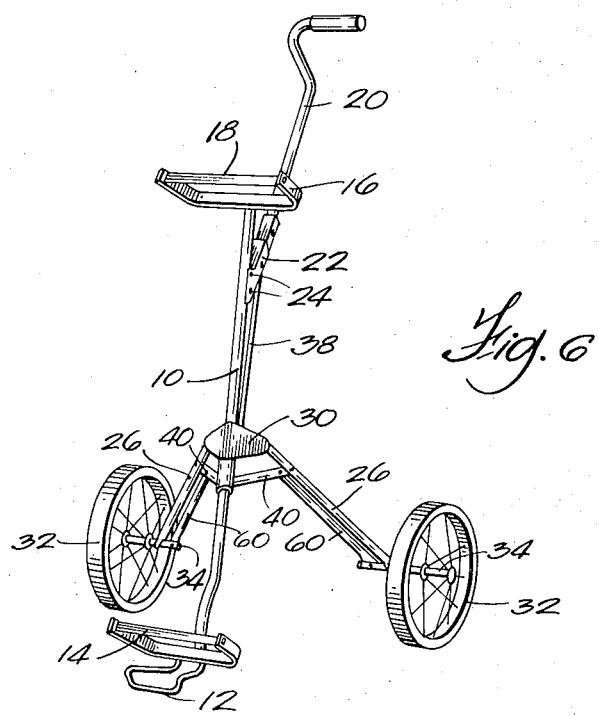
FIG. 6 is a perspective view of a golf cart embodying a slightly modified form of the present invention.

Referring now to the drawings in detail, FIG. 1 shows a golf cart comprising a main tubular body or frame member 10 having a bag support bracket 12 and strap 14 mounted on the lower end thereof and a bag holding bracket 16 and strap 18 mounted on the upper end thereof.

A handle 20 is pivotally mounted on a handle bracket 22 which in turn is fastened to the upper portion of body member 10 by any suitable means such as rivets 24.

Two pairs of wheel support members or struts 26 and 28 are pivotally mounted on a wheel support bracket 30 which in turn is fastened to the central portion of the body member 10 by any suitable means such as rivets (not shown). A pair of wheels 32, 32 are rotatably mounted on axles 34 which in turn are pivotally connected to the ends of struts 26, 28 as will be explained in more detail hereinafter.

The wheels 32 can be moved between an operating position (as shown) and a storage position (not shown) by means of a collar 36 slidably mounted on body member 10. The mechanism further includes a link member 38 pivotally connected between handle 20 and collar 36 and a pair of smaller link members 40, 40 pivotally connected between struts 26 and collar 36. Thus, as handle 20 is pivoted up and down, collar 36 will slide up and down on member 10 which action will cause struts 26, 28 to be pivoted inwardly and outwardly from the main body member 10.

To provide a strong and durable connection between wheel axles 34 and struts 26, 28 the end portions 42 of such struts are formed in a unique manner. As shown in FIGS. 3, 4 and 5, the struts are made from tubular material preferably of aluminum. The first step in the formation of end portions 42 is to crimp the end of the tube (FIG. 3) to thereby deform the tube end to a configuration like that shown in FIG. 4. This crimping action in effect forms a pair of smaller tube portions 44 joined together along a line indicated by reference numeral 46.

The next step is a combined splitting and flattening step wherein the end of the strut is further deformed from the configuration of FIG. 4 to the configuration of FIG. 5. As shown in FIG. 5, the completed end portion 42 of the tube is comprised of a pair of parallel extending spaced arms 48, 48 formed integrally with strut 26. Each arm 48 is comprised of outer and inner wall portions 50, 52 which are flattened against each other and formed integrally with each other with the inner walls 52 being split longitudinally along lines 54.

Figure 7:
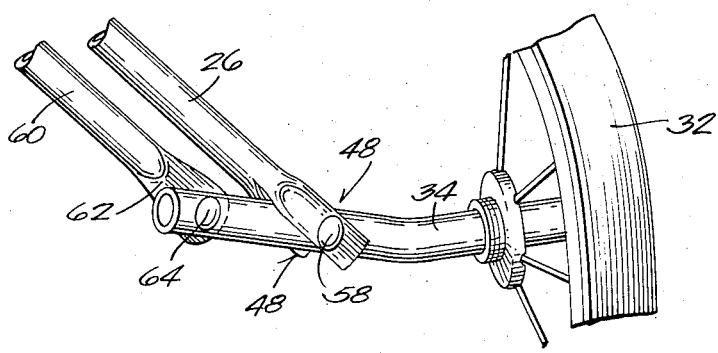
FIG. 7 is an enlarged fragmentary perspective view of the wheel support structure of the cart shown in FIG. 6.

The final step is to punch or otherwise produce a pair of space openings 56, 56 in the arms 48. Since the strut 28 is identical to that of strut 26, no separate description of strut 28 will be necessary. The axle 34 is pivotally connected to the end portions 46 of struts 26, 28 by any suitable means such as rivets 58 which extend through openings 56 in arms 48 and through an opening (not shown) in the axle with arms 48 positioned on opposite sides of the axle. As indicated previously, the resulting pivoted joint between the axle and the struts is superior to peviously known arrangements and provides greatly increased strength characteristics at the joint. This is of particular significance since this is the part of the cart structure which is generally subjected to the greatest stress and strain. Referring now to the slightly modified embodiment of the present invention shown in FIGS. 6 and 7, the modification resides in the use of only one specially designed strut member 26 for each axle instead of two as in the FIG. 1-2 embodiment described above. In this embodiment the second strut 28 is replaced with a strut 60. Strut 60 has a flattened end portion 62 which is pivotally connected to one face of axle 34 by a rivet 64. The upper ends of strut 60 are pivotally connected to arms 40, 40 as shown in FIG. 6. This modified arrangement will obviously not provide the degree of strength and durability as will the embodiment of FIGS. 1 and 2. This modification, however, illustrates a useful application of the present invention using only a single strut 26 for each axle and represents a significant improvement over prior designs.

I claim:

1. A wheel support structure for a golf cart comprising:
   a frame member;
   an axle member having a wheel rotatably mounted thereon;
   a strut means for mounting said axle member on said frame member, said strut means including at least one strut member fastened to said frame member at its upper end and having an end portion at its lower end adapted for pivotal connection to said axle member, said end portion comprised of a pair of parallel extending spaced arms formed integrally with said strut member, each of said arms comprised of outer and inner wall portions which are flattened against each other and which are formed integrally with each other; and
   a means for pivotally connecting said end portion of said strut to said axle, said means including a pin member passing through said axle and through said arms with the arms positioned on opposite sides of said axle.

2. A wheel support structure for a golf cart according to claim 1 in which each of said inner wall portions of each arm is split longitudinally along the length thereof.

3. A wheel support structure for a golf cart according to claim 2 in which said strut means includes a second strut member of substantially identical construction to that of said one strut member, said second strut member being pivotally connected to said axle member at its lower end and fastened to said frame member at its upper end.

* * * * *

PO-1050
(5/69)

UNITED STATES PATENT OFFICE
CERTIFICATE OF CORRECTION

Patent No. 3,807,751          Dated April 30, 1974

Inventor(s) JOHN JENINGA (NMI)

It is certified that error appears in the above-identified patent and that said Letters Patent are hereby corrected as shown below:

The assignee "SIT 'N REST GOLF, INC., Milwaukee, Wis." set forth in the patent is corrected to read --ATLANTIC PRODUCTS CORPORATION, Trenton, New Jersey--.

Signed and sealed this 28th day of January 1975.

(SEAL)
Attest:

McCOY M. GIBSON JR.
Attesting Officer

C. MARSHALL DANN
Commissioner of Patents